US012476420B2

(12) United States Patent
Oberhommert et al.

(10) Patent No.: US 12,476,420 B2
(45) Date of Patent: Nov. 18, 2025

(54) HOUSING OF AN ELECTRICAL PLUG CONNECTOR AND ELECTRICAL PLUG CONNECTOR

(71) Applicant: WAGO Verwaltungsgesellschaft mbH, Minden (DE)

(72) Inventors: Torben Oberhommert, Porta Westfalica (DE); Rudolf Mastel, Minden (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 350 days.

(21) Appl. No.: 18/119,516

(22) Filed: Mar. 9, 2023

(65) Prior Publication Data

US 2023/0291144 A1 Sep. 14, 2023

(30) Foreign Application Priority Data

Mar. 10, 2022 (DE) ..................... 10 2022 105 676.7

(51) Int. Cl.

| | |
|---|---|
| ***H01R 13/627*** | (2006.01) |
| ***H01R 13/50*** | (2006.01) |
| ***H01R 13/502*** | (2006.01) |
| ***H01R 13/639*** | (2006.01) |

(52) U.S. Cl.

CPC ......... *H01R 13/6273* (2013.01); *H01R 13/50* (2013.01); *H01R 13/502* (2013.01); *H01R 13/639* (2013.01)

(58) Field of Classification Search

CPC .. H01R 13/6273; H01R 13/50; H01R 13/502; H01R 13/639; H01R 13/44; H01R 13/516

See application file for complete search history.

(56) References Cited

U.S. PATENT DOCUMENTS

| | | | | |
|---|---|---|---|---|
| 5,791,923 | A | 8/1998 | Picaud et al. | |
| 9,478,907 | B2 * | 10/2016 | Mastel | H01R 24/68 |
| 11,955,746 | B2 * | 4/2024 | Mastel | H01R 13/44 |

(Continued)

FOREIGN PATENT DOCUMENTS

| | | | |
|---|---|---|---|
| DE | 69026782 | T2 | 9/1996 |
| DE | 69900597 | T2 | 8/2002 |

(Continued)

*Primary Examiner* — Abdullah A Riyami
*Assistant Examiner* — Nader J Alhawamdeh
(74) *Attorney, Agent, or Firm* — Muncy, Geissler, Olds & Lowe, P.C.

(57) ABSTRACT

A housing of an electrical plug connector, which has the following features: at least one plug chamber, accessible from a plug face of the plug connector, into which a mating plug connector designed as the mating piece for the plug connector may be inserted; four circumferential walls, which surround at least the plug chamber on the circumferential side and extend in parallel to an insertion direction, in which the mating plug connector may be inserted into the plug chamber; at least one elastically resilient locking tab is formed on at least one circumferential wall for the purpose of locking the mating plug connector on the plug connector; the at least one locking tab is designed as a material tongue separated from the material of the circumferential wall by cutaway sections on both sides. An electrical plug connector is also provided, which includes the housing.

15 Claims, 2 Drawing Sheets

(56) References Cited

U.S. PATENT DOCUMENTS

| | | | | |
|---|---|---|---|---|
| 2008/0119090 | A1* | 5/2008 | Giefers | H01R 13/6273 439/681 |
| 2015/0357754 | A1* | 12/2015 | Mastel | H01R 13/6273 439/345 |
| 2016/0301159 | A1 | 10/2016 | Bonucci et al. | |
| 2022/0328996 | A1* | 10/2022 | Mastel | H01R 13/44 |
| 2023/0291144 | A1* | 9/2023 | Oberhommert | H01R 13/502 |

FOREIGN PATENT DOCUMENTS

| | | | | | |
|---|---|---|---|---|---|
| DE | 20214928 | U1 | | 2/2004 | |
| DE | 202013100297 | U1 | | 3/2013 | |
| DE | 102015107304 | A1 | * | 11/2016 | F01L 1/352 |
| DE | 102017122649 | A1 | | 3/2019 | |

* cited by examiner

HOUSING OF AN ELECTRICAL PLUG CONNECTOR AND ELECTRICAL PLUG CONNECTOR

This nonprovisional application claims priority under 35 U.S.C. § 119(a) to German Patent Application No. 10 2022 105 676.7, which was filed in Germany on Mar. 10, 2022, and which is herein incorporated by reference.

BACKGROUND OF THE INVENTION

Field of the Invention

The invention relates to a housing of an electrical plug connector, which comprises: at least one plug chamber, accessible from a plug face of the plug connector, into which a mating plug connector designed as the mating piece for the plug connector may be inserted; four circumferential walls, which surround at least the plug chamber on the circumferential side and extend in parallel to an insertion direction, in which the mating plug connector may be inserted into the plug chamber; at least one elastically resilient locking tab is formed on at least one circumferential wall for the purpose of locking the mating plug connector on the plug connector; the at least one locking tab is designed as a material tongue separated from the material of the circumferential wall by cutaway sections on both sides. The invention also relates to an electrical plug connector, which includes the housing.

Description of the Background Art

The invention generally relates to the field of electrical plug connections. With the pin strip of the WAGO Series 0832, an electrical plug connector of this type is known in the form of a multipole pin strip, in which the outer side walls of the housing have particular locking tabs.

SUMMARY OF THE INVENTION

It is therefore an object of the invention to further improve such a housing of an electrical plug connector as well as an electrical plug connector formed therewith.

This object is achieved in an exemplary embodiment in that the housing includes at least one frame part, which spans the separated material tongue and the cutaway sections on both sides. The frame part thus forms a kind of bridge extending over the separated material tongue and the two cutaway sections. In this way, the stability of the housing may be significantly increased at the points where the circumferential wall is weakened by the separated material tongue. A stabilizing contour is thus added to the circumferential wall where the separated material tongue is present, which connects, for example, the upper and lower housing regions. This makes it possible to prevent the housing parts from collapsing to the inside or from being too easily pressed to the outside under mechanical load. The protection of the electrical plug connector against mismating as well as protection against contact may be improved by at least one stabilizing frame part of this type. An undesirable widening of the housing is avoided even if, for example, a test finger is inserted. The housing forms an improved mechanical resistance against malfunctions hereby. The frame part may span the material tongue, in particular in a direction perpendicular to the insertion direction.

The at least one frame part may be arranged on the side of the plug chamber facing the separated material tongue. The frame part may be arranged directly adjacent to the material tongue spanned by the frame part, for example, at a distance which is less than half the distance between the circumferential wall having the separated material tongue and one circumferential wall of the mentioned four circumferential walls in parallel thereto.

The at least one frame part can be arranged behind the material tongue spanned by the frame part, viewed from the plug chamber. This has the advantage that the insertion of the mating plug connector into the plug chamber is not hindered by the at least one frame part. The insertion of the mating plug connector may thus take place in the same way as with known plug connectors. The at least one frame part is thus arranged farther to the outside compared to the material tongue, viewed from the plug chamber. In other words, the frame part spans the material tongue on the outside, in particular in a direction perpendicular to the insertion direction.

The locking tab can be elastically deflectable in a direction perpendicular to the insertion direction of the mating plug connector when inserting the mating plug connector into the plug chamber. This permits a secure locking of the mating plug connector on the housing of the electrical plug connector. The locking tab may thus be elastically bent out of the plane of the circumferential wall on which the locking tab is arranged. The locking action between the plug connector and the mating plug connector may take place, for example, by means of latching elements, for example, by one latching element arranged on the locking tab and a mating latching element corresponding thereto on the mating plug connector.

The deflection movement of the locking tab can be limited by the at least one frame part perpendicularly to the insertion direction, in that the at least one frame part forms a stop for the locking tab. An improper, too-far deflection of the locking tab and therefore a possible damage are avoided in this way. No additional component is advantageously needed for this purpose, because this function may be performed by the frame part. For this purpose, the at least one frame part is advantageously arranged to overlap with the locking tab, for example, to overlap with the free end of the locking tab.

The four circumferential walls can comprise an upper wall and a lower wall, which are arranged in parallel to each other, as well as two side walls, which are arranged in parallel to each other and are arranged essentially at right angles to the upper and lower walls. An essentially rectangular or square cross-sectional contour of the plug chamber may be provided in this way.

The at least one elastically resilient locking tab may be formed on one or on both side walls, which is designed as a material tongue separated from the material of the side wall by cutaway sections on both sides. The at least one frame part, which spans the separated material tongue and the cutaway sections on both sides on the particular side wall, may be present on one or on both side walls. The frame part thus joins the upper and lower circumferential walls to each other in a stabilizing manner.

The at least one frame part can extend from a first end of the frame part to a second end of the frame part, the first end being connected to the side wall where the frame part is arranged and/or to the upper wall, and the second end being connected to the side wall where the frame part is arranged and/or to the lower wall. In this way, a robust, essentially quadrilateral frame may be formed around the plug chamber, by means of which the housing is supported and stabilized even in the region of the cutaway material tongues. The frame part may in this way form a closed frame on the circumferential side at the insertion opening for the mating plug connector.

If a locking tab is formed on each of the two side walls as a material tongue separated as sections of the material of the circumferential wall cut away on both sides, a frame part may be present in the region of each of the two side walls, which spans the separated material tongue and the cutaway sections on both sides on the particular side wall. Due to the two frame parts, an essentially quadrilateral frame may be provided together with regions of the upper and lower walls in the region of the plug face. The distance between the two frame parts may be greater than the distance between the two side walls.

The at least one frame part can be arranged closer to the free end than to the root region of the separated material tongue. The stabilizing effect of the frame part may be maximized hereby.

The at least one frame part can form a portion of the plug face of the plug connector. The at least one frame part may be effectively integrated into the housing hereby both functionally and in terms of design. The separated material tongue may also end with its free end on the plug face of the plug connector.

The separated material tongue can have a length, measured in the insertion direction, which is in the range of 20% to 60% of the length of the housing, measured in the insertion direction, in particular in the range of 30% to 50% of the length of the housing. A material tongue having a high mobility and low danger of breaking may be implemented hereby.

The separated material tongue can have a width, measured perpendicularly to the insertion direction, which is in the range of 40% to 90% of the width of the circumferential wall where the material tongue is formed, measured perpendicularly to the insertion direction, in particular in the range from 50% to 80% of the width of the circumferential wall. The material tongue may be designed to be particularly robust hereby and also offers sufficient space for housing a latching element for locking the mating plug connector. The material thickness of the separated material tongue may, for example, essentially correspond to the material thickness of the assigned circumferential wall.

The at least one frame part can be designed to form a single piece with a housing base body of the housing, which has the four circumferential walls. This has the advantage that the housing, together with the frame part or the multiple frame parts, may be particularly efficiently and cost-effectively manufactured in a manufacturing step, for example, in a plastic injection molding process.

The at least one frame part can be designed to form a separate component, which is fastened to a housing base body of the housing, which has the four circumferential walls. In this way, the housing may be also be provided with retrofittable frame parts, which may be mounted, for example, by the user. The aforementioned embodiments of the invention may also be combined with each other, for example, in such a way that one frame part is designed to form a single piece with the housing base body and another frame part is designed as a separate component.

The housing can have at least one receiving chamber for receiving a plug contact of the plug connector. A receiving chamber of this type, which is present in addition to the plug chamber, offers advantageous attachment possibilities for the plug contact, for example, for a mechanical latching of the plug contact in the housing. The plug contact may be designed, for example, as a pin contact or a blade contact. In this case, the plug contact includes a contact pin or a contact blade, which projects into the plug chamber in the state of the plug contact mounted in the housing. The receiving chamber may be arranged, for example, adjacent to the plug chamber, for example separated therefrom only by a housing wall.

In an example, the material tongue does not project over the frame part in the insertion direction.

The at least one frame part can have a dimension in the insertion direction which is less than half the length of the material tongue in the insertion direction.

The side walls, with the exception of the cutaway sections on both sides, can be designed as completely closed walls.

The at least one frame part can be arranged on the plug face side of the housing.

The object mentioned at the outset is also achieved by an electrical plug connector, which includes a housing of the type explained above, and at least one plug contact, which may be electrically contacted by a mating plug connector inserted into the plug chamber. The advantages explained above may also implemented hereby. For example, the electrical plug connector may be designed as a single-pole pin strip, including a housing, which has material tongues cut away on both side walls as locking tabs.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
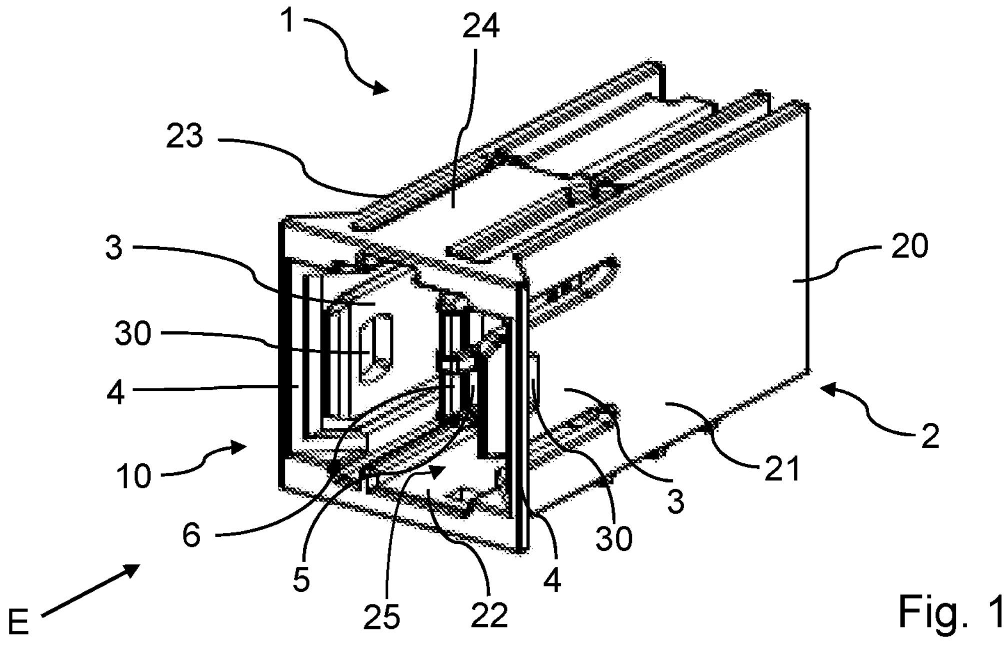
FIG. 1 is an electrical plug connector in a perspective view.

Electrical plug connector 1 illustrated in FIG. 1 includes a housing 2 having a housing base body 20, on which four circumferential walls 21, 22, 23, 24 are formed. Circumferential walls 21, 22, 23, 24 each form a side wall 21, 23 on the left and the right, which are arranged in parallel to each other, as well as an upper wall 24 and a lower wall 22, which are also arranged in parallel to each other. Side walls 21, 23 are each arranged essentially at right angles to lower wall 22 and to upper wall 24.

Circumferential walls 21, 22, 23, 24 surround a plug chamber 25 on the circumferential side. A portion of an electrical plug contact 5, which includes a contact protection element 6 to protect against being touched by people, extends into plug chamber 25. This plug contact 5 may be electrically contacted by a mating plug connector inserted into plug chamber 25. The mating plug connector is to be inserted into plug chamber 25 in an insertion direction E. The side on which the mating plug connector may be connected to plug connector 1 is also referred to as plug face 10.

To securely lock the mating plug connector inserted into plug chamber 25 on plug connector 1, particular locking tabs are present on side walls 21, 23 of housing 2, which are each formed by material tongues 3 separated from the material of particular side wall 21, 23 by cutaway sections on both sides. Material tongues 3 extend with their free end in the direction of plug face 10. A latching element 30 is located on each of material tongues 3, which may interact with a corresponding mating latching element on the mating plug connector for the purpose of effectuating a locking action of the mating plug connector on plug connector 1. In the illustrated exemplary embodiment, latching elements 30 are designed as recesses in particular material tongue 3. However, they may also be designed as material projections.

Material tongues 3 form elastically resilient locking tabs in this way, which may be deflected in a direction perpendicular to insertion direction E, i.e., out of the plane of particular side wall 21, 23.

Side walls 21, 23, which are weakened by the cutaway sections, are stabilized by particular frame parts 4. Each material tongue 3 is assigned to one frame part 4 or is arranged in its direct vicinity. It is apparent that frame parts 4 are arranged on the outside, i.e., behind particular material tongue 3, viewed from plug chamber 25. Particular frame part 4 spans separated material tongue 3 assigned in each case and the associated cutaway sections. Particular frame part 4 may be connected for this purpose to assigned side wall 21 or 23 and/or to upper wall 24 at its one (upper) end. Particular frame part 4 may be connected to assigned side wall 21 or 23 and/or to lower wall 22 at its other (lower) end.

Figure 2:
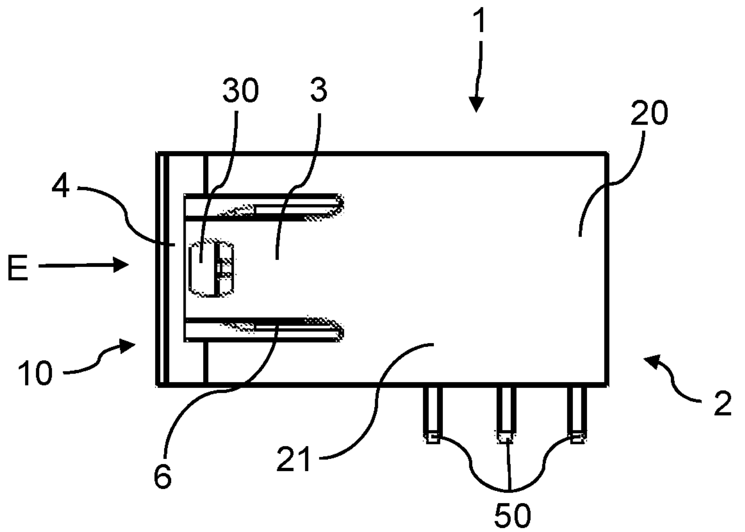
FIG. 2 is the electrical plug connector according to FIG. 1 in a side view.

FIG. 2 shows that particular material tongue 3 is designed to overlap with its assigned frame part 4 in the longitudinal direction of the plug connector or in insertion direction E. If material tongue 3 is deflected toward the outside, this deflection movement is limited by assigned frame part 4. Frame part 4 thus forms a stop for material tongue 3 or the locking tab.

Figure 3:
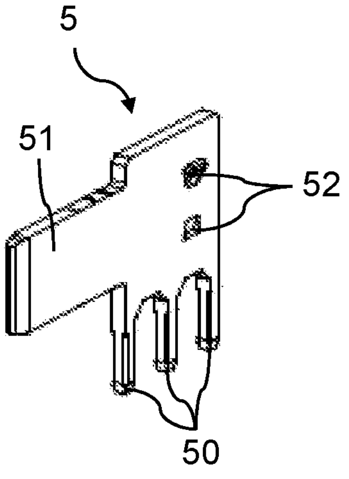
FIG. 3 is a plug contact of the plug connector in a perspective view.

FIG. 3 shows an example of electrical plug contact 5, which may have a connecting section 51 projecting into plug chamber 25, i.e., in the form of a blade or pin contact. This connecting section 51 may be electrically contacted, for example, by a bifurcated contact of the mating plug connector. Plug contact 5 may have outer connecting contacts 50 for connection to at least one electrical line, for example in the form of pin contacts which may be soldered, for example, into a circuit board. Plug contact 5 may furthermore have fixing elements 52, with the aid of which plug contact 5 may be fixed in housing 2, for example by means of a latching action. As illustrated in FIG. 2, connecting contacts 50 may project out of housing 2.

Figure 4:
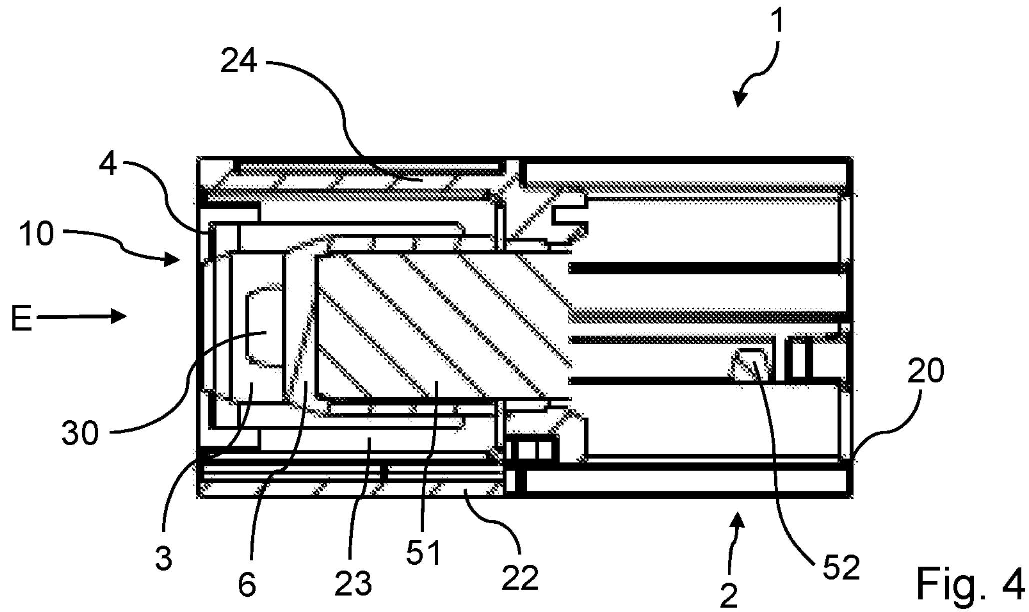
FIG. 4 is the plug connector in a partially cutaway side view.

FIG. 4 shows, in particular on the basis of the front region of plug connector 1 shown in the sectional representation, i.e., the region facing plug face 10, how plug contact 5 may project together with connecting section 51 into plug chamber 25, in order to be contacted there by the mating plug connector.

Figure 5:
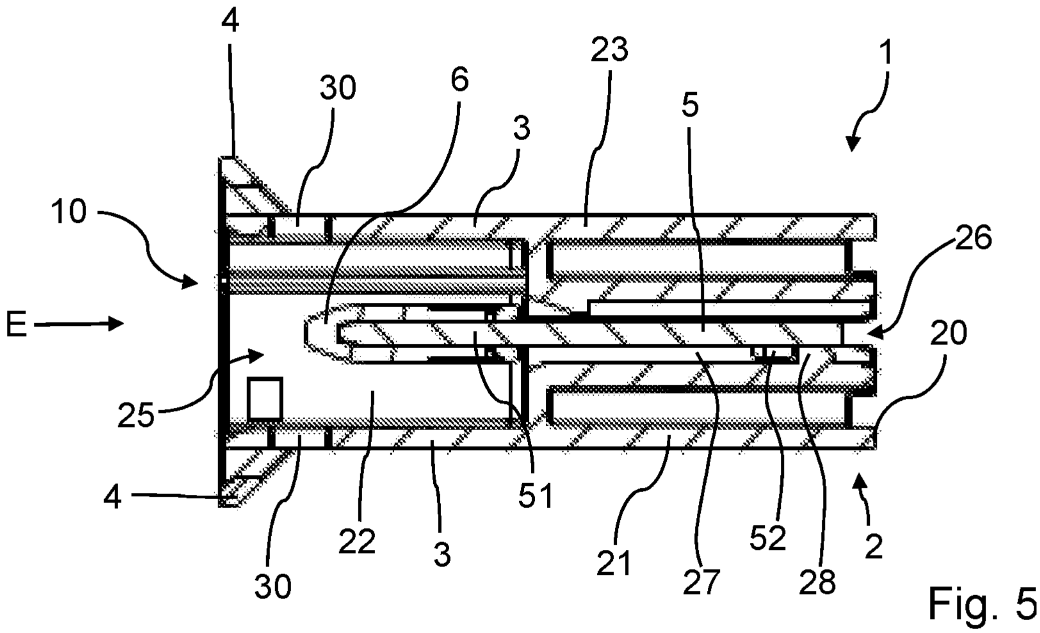
FIG. 5 is the plug connector in cutaway top view.

FIG. 5 shows the arrangement of the individual elements in the cutaway top view. It is apparent that frame parts 4 may be connected to particular side wall 21, 23 or lower and/or upper wall 22, 24 with the aid of a ramp-like transition. A robust attachment of frame parts 4 to circumferential walls 21, 22, 23, 24 of housing 2 is ensured by the ramp-like transition. The ramp-like transition may also form an insertion funnel for the mating plug connector.

It is also illustrated in FIG. 5 that at least one of fixing elements 52 of plug contact 5 projects into a side recess 27 of a receiving channel 26 arranged in housing 2 for plug contact 5. A material projection 28, which projects into receiving channel 26, is provided behind fixing element 52, viewed in insertion direction E. Material projection 28 prevents housing 2 from being able to be pulled off of plug contact 5 against insertion direction E if a tensile load is applied to housing 2, caused, for example, by the mating plug connector. Material projection 28 thus forms a stop for fixing element 52.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing of an electrical plug connector, the housing comprising:

at least one plug chamber, which is accessible from a plug face of the plug connector, into which a mating plug connector designed as a mating piece for the plug connector is adapted to be inserted;

four circumferential walls that surround at least the plug chamber on a circumferential side and extend substantially in parallel to an insertion direction, in which the mating plug connector is adapted to be inserted into the plug chamber;

at least one elastically resilient locking tab formed on at least one circumferential wall for locking the mating plug connector on the plug connector, the at least one locking tab being designed as a material tongue, which is separated from a material of the circumferential wall by cutaway sections on both sides, and the locking tab being elastically deflectable in a direction substantially perpendicular to the insertion direction of the mating plug connector into the plug chamber; and at least one frame part that spans the locking tab and the cutaway sections on both sides of the locking tab, wherein, the at least one frame part is positioned exterior to the locking tab, such that when the locking tab is deflected outward, in a direction away from the plug chamber, the locking tab contacts the at least one frame part so that the at least one frame part limits outward movement of the locking tab and forms a stop for the locking tab.

2. The housing according to claim 1, wherein, when viewed from the plug chamber, the at least one frame part is arranged behind the locking tab.

3. The housing according to claim 1, wherein the four circumferential walls comprise an upper wall and a lower wall, which are arranged in parallel to each other, as well as two side walls, which are arranged in parallel to each other and are arranged essentially at right angles to the upper and lower walls.

4. The housing according to claim 3, wherein the locking tab is formed on one or on both of the two side walls.

5. The housing according to claim 4, wherein the at least one frame part is present on one or on both of the two side walls.

6. The housing according to claim 5, wherein the at least one frame part extends from a first end to a second end, the first end being connected to the respective side wall where the frame part is arranged and/or to the upper wall, and the second end being connected to the respective side wall where the frame part is arranged and/or to the lower wall.

7. The housing according to claim 1, wherein the at least one frame part is situated closer to a free end of the locking tab than to a root end of the locking tab.

8. The housing according to claim 1, wherein the at least one frame part forms a portion of the plug face of the plug connector.

9. The housing according to claim 1, wherein a free end of the locking tab is situated at the plug face of the plug connector.

10. The housing according to claim 1, wherein the locking tab has a length measured in the insertion direction, which is in a range of 20% to 60% of a length of the housing measured in the insertion direction or in a range of 30% to 50% of the length of the housing.

11. The housing according to claim 1, wherein the locking tab has a width, measured perpendicularly to the insertion direction, which is in a range of 40% to 90% of a width of the circumferential wall measured perpendicularly to the insertion direction on which the locking tab is formed, or in a range of 50% to 80% of the width of the circumferential wall.

12. The housing according to claim 1, wherein the at least one frame part is designed to form a single piece with a housing base body of the housing, which has the four circumferential walls.

13. The housing according to claim 1, wherein the at least one frame part is designed as a separate component, which is fastened to a housing base body of the housing, which has the four circumferential walls.

14. The housing according to claim 1, wherein the housing has at least one receiving chamber for receiving a plug contact of the plug connector.

15. An electrical plug connector comprising a housing according to claim 1, and comprising at least one plug contact that is adapted to be electrically contacted by a mating plug connector inserted into the plug chamber.

* * * * *